United States Patent [19]
Clark

[11] Patent Number: 5,700,299
[45] Date of Patent: Dec. 23, 1997

[54] BATTERY CORE WINDER AND METHOD OF WINDING A BATTERY CORE

[75] Inventor: Thomas C. Clark, Hampton Lake, Fla.

[73] Assignee: Eveready Battery Company, Inc., St. Louis, Mo.

[21] Appl. No.: 764,740

[22] Filed: Dec. 12, 1996

[51] Int. Cl.⁶ ............................. H01M 6/00; B23P 19/04
[52] U.S. Cl. ..................... 29/623.1; 29/730; 242/444.1; 156/446
[58] Field of Search .................. 29/623.1, 730, 29/731; 242/444.1, 444.3; 156/446, 457, 458; 429/94

[56] References Cited

U.S. PATENT DOCUMENTS

| | | | |
|---|---|---|---|
| 1,269,778 | 6/1918 | Becker. | |
| 2,849,191 | 8/1958 | Gadler | 242/56 |
| 3,163,374 | 12/1964 | Horn et al. | 242/56.1 |
| 3,839,088 | 10/1974 | Hug et al. | 136/13 |
| 4,099,401 | 7/1978 | Hug et al. | 72/147 |
| 4,112,202 | 9/1978 | Hug et al. | 429/94 |
| 4,216,579 | 8/1980 | Murata et al. | 29/730 |
| 4,296,546 | 10/1981 | Hill et al. | 29/730 |
| 4,369,571 | 1/1983 | Sugalski | 29/731 |
| 4,402,784 | 9/1983 | Romero-Medrano | 156/446 |
| 4,559,700 | 12/1985 | Sugalski et al. | 29/623.1 |
| 4,709,472 | 12/1987 | Machida et al. | 29/623 |
| 4,975,095 | 12/1990 | Strickland et al. | 29/623.1 |
| 5,045,086 | 9/1991 | Juergens | 29/623.1 |
| 5,323,527 | 6/1994 | Ribordy et al. | 26/623.1 |
| 5,370,711 | 12/1994 | Audit et al. | 29/623.1 |

FOREIGN PATENT DOCUMENTS 3-27150  2/1991  Japan ..................... 139/102

*Primary Examiner*—Anthony Skapars
*Attorney, Agent, or Firm*—Robert W. Welsh

[57] ABSTRACT

A battery core winding apparatus for winding into an electrochemical cell, a plurality of flexible strip members comprising a first conducting flexible electrode having a first leading edge, a second conducting flexible electrode having a second leading edge, and a separator, includes a first elongate feeder bed and a second elongate feeder bed longitudinally disposed from the first feeder bed. A winding cavity is formed between the feeder beds. A first arbor half having a first flat surface and a first curvilinear winding surface is rotatingly supported within the winding cavity substantially midway between the first and the second feeder beds, and a second arbor half having a second flat surface and a second curvilinear winding surface is rotatingly supported within the winding cavity such that the second flat surface faces the first flat surface and the first and second flat surfaces are interspaced to form a slot. A first pair of forming rollers are rotatingly supported and disposed within the winding cavity proximate to and forming a gap with the first curvilinear surface, and a second pair of forming rollers are disposed within the winding cavity proximate to and forming a gap with the second curvilinear surface. At least one feeder roller is rotatingly embedded in each of the first and second feeder beds, the rotational axis of each roller being substantially perpendicular to the elongate axis of the feeder beds, and a pressure roller is rotatingly mounted in registration with each of the feeder rollers, the pressure roller axis of rotation being parallel to that of the feeder roller and each pressure roller is spring biased against its adjacent feeder roller.

11 Claims, 3 Drawing Sheets

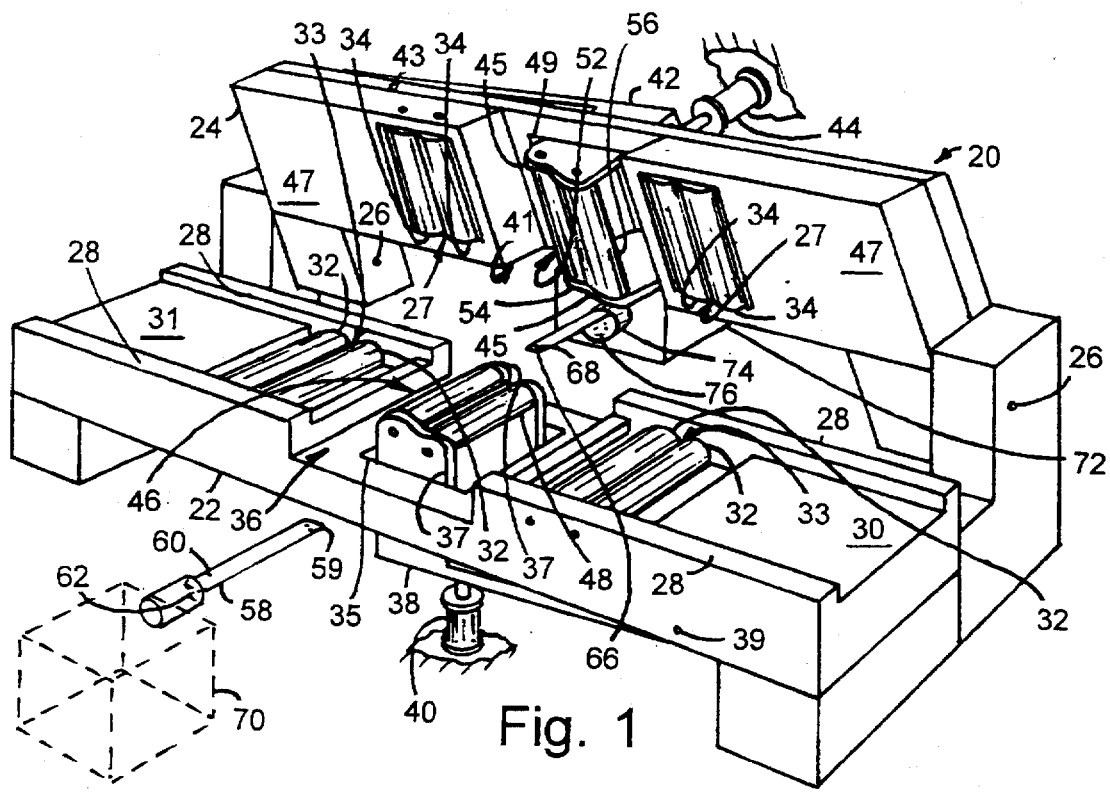
Fig. 1
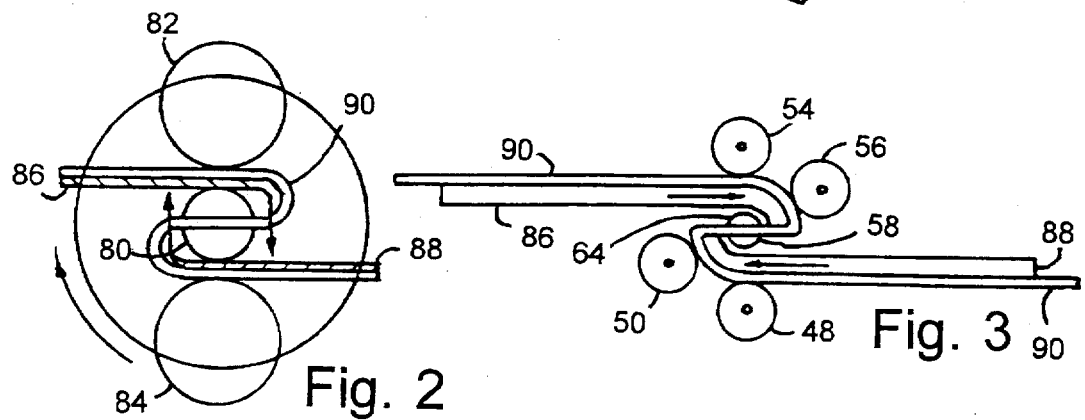
Fig. 2
Fig. 3
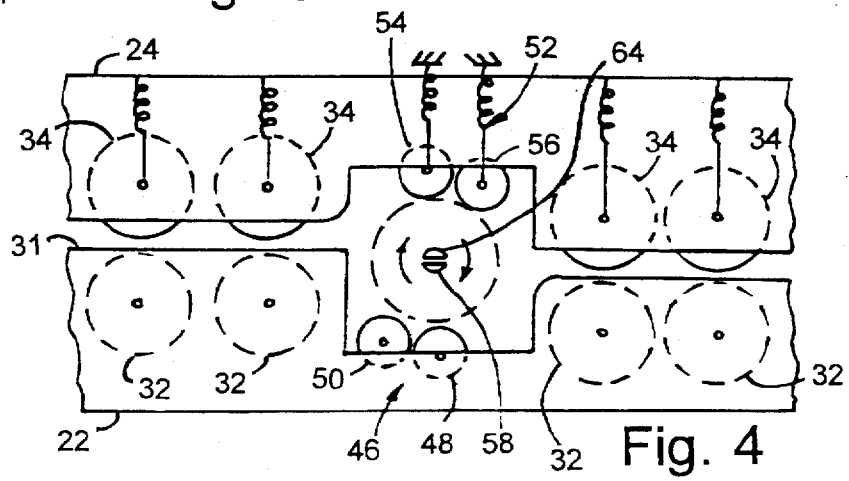
Fig. 4

BATTERY CORE WINDER AND METHOD OF WINDING A BATTERY CORE

BACKGROUND OF THE INVENTION

This invention relates to an apparatus and method for producing spirally wound electrochemical components, and more particularly relates to the production of tightly wound spiral cell packs.

A variety of apparatuses and methods for spirally winding electrochemical cells into a cylindrical "jelly roll" configuration are well known in the art. A jelly roll battery core is generally formed by stacking a series of flat elongate electrode plates with a dielectric separator interwoven between the plates and rolling the plates into a generally cylindrical form. An orbital winder begins to wind the electrodes about an arbor with a "kiss" roller maintaining pressure against the formed battery roll and arbor. The roller is then transferred to a fixed diameter nest to complete the winding operation. During the winding process, there is only one contact point between the arbor and either the kiss roller or the fixed diameter nest. A flex winder or a chain winder winds the entire roll in one operation in a fixed diameter nest. The flex and chain winders also have only one contact point between the arbor and the winding nest. Another type of winding apparatus employs two kiss rollers at diametrically opposite sides of an arbor. The arbor is rotatingly driven with one electrode being fed from one side of the winder to the arbor between one kiss roller, and the arbor and the other electrode is fed from an opposite side of the winder to the arbor between the other kiss roll and the arbor. This battery roll is also wound in a fixed diameter nest; however, the two kiss rollers provide two external contact points with the formed jelly roll core.

The existing spiral winders discussed above are beneficial in forming a variety of wound battery cores for differing applications; however, these apparatuses often produce wound cores having inconsistent cross-sectional geometrical configurations. Also, the single point contact apparatuses result in core windings which may not be adequately formed, thereby resulting in stress points occurring between the electrodes and the dielectric separator. The stress between the electrode plate ends and the separator can result in the perforation of the separator by one of the electrodes, thereby causing a short between the electrodes.

With progress in electronic technology, today's electronic appliances such as calculators, hand held televisions, radios, and the like, no longer require large amounts of electrical power for the appliances to function. The decreased power demands and the miniaturization of electrical appliances has created a demand for increasingly smaller batteries. While current appliances utilize AA and AAA size batteries, the newer miniaturized appliances will require smaller AAAA size batteries. The AAAA size batteries have a relatively small cross-sectional diameter (on the order of 0.150 inch) and therefore require a small tightly wound battery core. This tightly wound battery core also requires the use of an arbor with a small diameter to minimize the central axial void which remains in the battery core after withdrawal of the arbor. Larger batteries such as "C" cells and "D" cells had a relatively large cross-sectional area when compared to the cross-sectional area of the arbor. However, battery diameters have been decreasing faster than the diameter of the winding arbors such that the cross-sectional diameter of the arbor is now a significant percentage of the battery core cross section. Since the arbor is withdrawn from the core after winding, thus leaving a void the length of the battery, the arbor size represents lost battery power. The size of the arbor is dictated by strength considerations since a driven arbor is often used to draw the electrodes and separator from the feeder to the winding mechanism. Also, the stresses induced in the electrodes/jelly roll by the rotation of the arbor and subsequent winding of the separator are used to begin forming the electrodes in the spiral. Such a prior art apparatus is shown in FIG. 2.

The industry has a need for a new type of battery core winding apparatus which utilizes an arbor of minimal diameter and which can produce a tightly wound battery core. A battery core so produced must still yield maximum electrical power in today's miniaturized electronic appliances. These small battery cores must also be produced reliably and with minimum defects and rejections.

SUMMARY OF THE INVENTION

One aspect of the present invention is a battery core winding apparatus for winding into an electrochemical cell, a plurality of flexible strip members comprising a first conducting flexible electrode having a first leading edge, a second conducting flexible electrode having a second leading edge, and a separator. The apparatus includes a first elongate feeder bed and a second elongate feeder bed longitudinally disposed from the first feeder bed. A winding cavity is formed between the feeder beds. A first arbor half having a first flat surface and a first curvilinear winding surface is rotatingly supported within the winding cavity substantially midway between the first and the second feeder beds, and a second arbor half having a second flat surface and a second curvilinear winding surface is rotatingly supported within the winding cavity such that the second flat surface faces the first flat surface and the first and second flat surfaces are interspaced to form a slot. At least one feeder roller is rotatingly embedded in each of the first and second feeder beds wherein the rotational axis of the rollers is substantially perpendicular to the elongate axis of the feeder beds, and a pressure roller is rotatingly mounted in registration with each of the feeder rollers wherein the rotational axis of the pressure roller is parallel to the feeder roller axis and each pressure roller is spring biased against its respective feeder roller.

The principle objects of the present invention are to provide an electrochemical cell winding apparatus wherein the electrochemical cell elements, a positive electrode plate, a negative electrode plate, and a separator, are wound in a tight spiral cell having a central void of minimal cross section where the winding arbor was positioned during the winding process. The respective feeder beds are typically in parallel but displaced planes, with the arbor positioned intermediate of the planes, such that the electrodes and separator are pulled into the cell winding cavity by a positively driven arbor. The electrodes and separator are pulled into engagement with the arbor for forming thereabout the exterior curvilinear surface of the arbor by forming rollers which are biased toward the exterior curvilinear surface of the arbor and contact the wound cell as the cell is being wound.

One roller of each of a forming roller pair is proximate to but not contacting a curvilinear surface of a respective arbor half essentially in a vertical plane perpendicular to a respective feeder bed wherein the space between the roller and curvilinear surface is approximately in the same plane as the feeder bed to receive the electrode plate and separator therebetween as they are drawn into the winding cavity from the feeder bed. The second roller of the forming roller pair is positioned to deflect and form the electrode plate to conform to the curvilinear surface of the arbor and electrochemical cell core as the plate exits from engagement with the first roller. One arbor half is typically retractable from the completed wound cell to facilitate the placement of a cell canister about the wound cell core, the wound cell core then being translated off the remaining arbor half into a cell canister without withdrawing the forming rollers from contact with the cell core until the cell core is completely inserted in the canister.

These and other advantages of the invention will be further understood and appreciated by those skilled in the art by reference to the following written specification, claims and appended drawings.

BRIEF DESCRIPTION OF THE DRAWINGS

FIG. 1 is a perspective view of a battery core winding apparatus embodying the present invention.

FIG. 2 is a schematic illustration of a prior art battery core winder utilizing two kiss rollers and wherein the electrodes are formed around the arbor by the force exerted on the electrode leading edges by the separator on the electrode leading edges.

FIG. 3 is an illustration of the present invention wherein a second set of forming rollers are utilized to form the electrodes about the arbor.

FIG. 4 is a schematic illustration of the battery core winding apparatus including the arbor, the nest rollers, the feeder beds, and the feeder bed rollers.

DETAILED DESCRIPTION OF THE PREFERRED EMBODIMENTS

Figure 5:
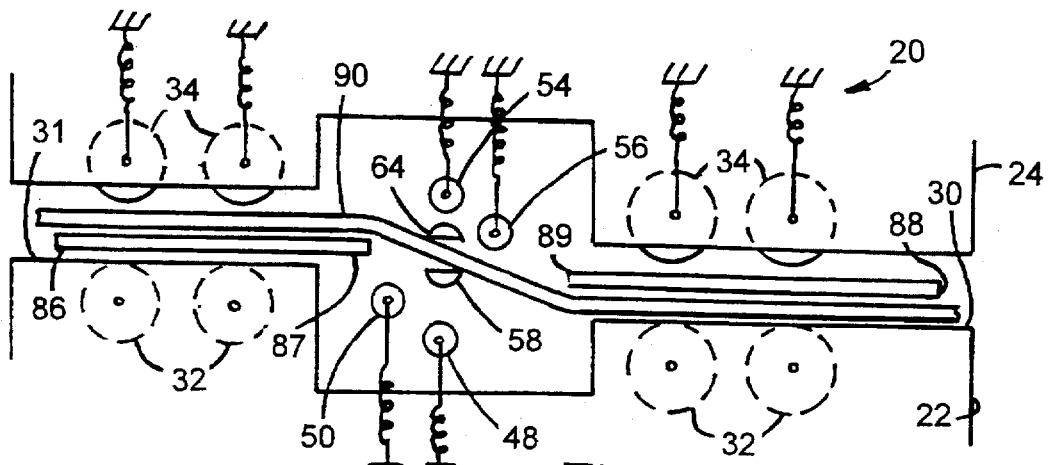
FIG. 5 is an illustration of the winding apparatus with the electrodes and separator positioned prior to beginning the core winding process.

For purposes of description herein, the terms "upper," "lower," "right," "left," "rear," "front," "vertical," "horizontal," and derivatives thereof shall relate to the invention as oriented in FIGS. 1 and 4. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a battery core winding apparatus 20, which is one of the preferred embodiments of the present invention, and illustrates its various components.

Winder 20, most easily seen in FIG. 1, includes lower frame 22 and upper frame 24. Upper frame 24 is hinged at hinge points 26 to lower frame 22 thereby permitting upper frame 24 to be rotated up and away from lower frame 22 for loading of battery core elements for subsequent winding, and down to operating engagement with lower frame 22 of a battery core.

Lower frame 22 is generally an elongate metallic block having a winding cavity 36 positioned at an intermediate point. Cavity 36 is oriented from the front to the back of frame 22. First feeder bed 30 extends to the right of cavity 36 and second feeder bed 31 extends to the left thereof. Second feeder bed 31 is raised slightly higher than first feeder bed 30 to facilitate the proper feeding of the electrode plates during the winding process as described in greater detail below. First and second feeder beds 30 and 31 have feeding guides 28 positioned at forward and rear edges of feeder beds 30 and 31. Guides 28 are raised above each side of beds 30 and 31 to guide the edges of the electrode plates during winding. A feed roller recess 33 is positioned in beds 30 and 31 at either side of winding cavity 36. Two feed rollers 32 are rotatingly mounted within each feed roller recess 33. Feed rollers 32 are typically metal free-rotating rollers whose axis is generally perpendicular to the long dimension of frame 22. The upper tangential surface of each roller 32 is generally in the same plane as or slightly raised above first and second feed beds 30 and 31. An aperture 35 extends through frame 22 within winding cavity 36. Lower roller frame 38 is pivotally mounted to frame 22 at pivot 39. Lower roller frame 38 also comprises upstanding support arms 37 which project vertically upward through aperture 35. A first pair of forming rollers 46 are rotatingly supported between support arms 37. First pair of forming rollers 46 are comprised of a first kiss roller 48 and a first forming roller 50. First forming roller 50 is positioned to the left of and elevated slightly higher than first kiss roller 48. Lower roller frame 38 is raised and lowered within aperture 35 and about pivot 39 by lower pressure cylinder 40 which maintains a constant pressure on the wound battery core with first pair of forming rollers 46.

A first arbor half 58 is supported by front arbor drive 70 from front side of frame 22 and extends rearwardly in cantilevered fashion within winding cavity 36. Arbor half 58 has a first flat surface 60 and a first curvilinear surface 62. First arbor half 58 is positioned vertically above kiss roller 48 with first flat surface 60 facing upwardly and in a generally horizontal position forming a gap between first curvilinear surface 62 and rollers 48 and 50. A second arbor half 64 is supported by rear arbor drive 72 from the rear of lower frame 22 and is translatable forward and backward by drive shaft 74 to be in vertical registration with first arbor half 58. Second arbor half 64 has a second flat surface 66 and a second curvilinear surface 68. When second arbor half 64 is translated forward, second arbor half 64 is in vertical registration with first arbor half 58; with first flat surface 60 and second flat surface 66 facing each other and slightly separated, thereby forming a slot between arbor halves 64 and 58. When second arbor half 64 is translated forward, rear arbor drive shaft 74 receives first arbor end 59 in recess 76 and second arbor end 65 is received in similar fashion by a drive shaft in front of arbor drive 70. Front and rear arbor drives 70 and 72 are mutually engaged by a positive mechanical link (not shown) such that their respective drive shafts rotate in unison to provide rotational force to each end of the paired arbor halves 58 and 64.

Lower frame 22 generally comprises a first feeder bed 30 and a second feeder bed 31 on either side of frame 22. A winding cavity 36 is located at an intermediate point of frame 22 with first feeder bed 30 extending to the right therefrom and second feeder bed 31 extending to the left therefrom. Turning now to upper frame 24, upper frame 24 also comprises a generally elongate metallic block in which is positioned an intermediate winding cavity 41 and aperture 49 extending therethrough, A pressure roller recess 27 is formed proximate to and at either side of upper winding cavity 41. Two pressure rollers 34 are positioned within each pressure roller cavity 27, the pressure rollers are cylindrical in shape and the axis of rotation are generally perpendicular to the elongate direction of upper frame 24. Pressure rollers 34 are free-rotating; however, the lower tangential surface of rollers 34 extend below lower surface 47 of upper frame 24. Also, rollers 34 are spring biased to exert a downward force.

An upper roller frame 42 is pivotally attached to upper frame 24 at pivot 43. Upper roller frame 42 is similar to lower roller frame 38. Upper roller frame 42 includes support arms 45 depending downwardly therefrom and extending through aperture 49 in upper frame 24 into upper winding cavity 41. A second pair of forming rollers 52 extend between support arms 45 and are rotatingly supported thereby. A second kiss roller 54 is in vertical alignment with first kiss roller 48 and arbor halves 58 and 64. A second forming roller 56 is positioned to the right of second kiss roller 54 and slightly below second kiss roller 54. When upper frame 24 is pivoted into engagement with lower frame 22, rollers 54 and 56 form a gap with second curvilinear surface 68 in the same fashion as do first curvilinear surface 62 and rollers 48 and 50. Upper pressure cylinder 44 is actuatingly attached to upper roller frame 42 to raise and lower the second pair of forming rollers 52 into and out of engagement with the battery core winding.

Turning now to FIGS. 2–3, the prior art in FIG. 2 illustrates a split driven arbor 80 having a separator 90 engaged between arbor halves. As arbor 80 rotates clockwise, separator 90 draws positive electrode 86 into engagement between arbor 80 and kiss roller 82 while simultaneously drawing separator 90 and negative electrode 88 into engagement between arbor 80 and kiss roller 84. As positive and negative electrodes are drawn through the juncture of arbor 80 and kiss rollers 82 and 84, electrodes 86 and 88 tend to continue in opposing horizontal directions. However, since separator 90 has captured the leading edge of both electrodes 86 and 88, continued rotation of arbor 80 in a clockwise direction causes separator 90 to force the leading edges of electrodes 86 and 88 to conform to the curvilinear surface of arbor 80. The continued rotation of arbor 80 during the remainder of the forming process continues to deflect the respective electrodes as they emerge from between arbor 80 and kiss rollers 82 and 84. The stress induced in separator 90 from the rotation of arbor 80 and the tendency of electrodes 86 and 88 to continue in a horizontal direction results in potential breaches of the insulating property of the dielectric material of the separator 90. Such a breach of the insulting property can potentially cause a short between the positive and negative electrodes 86 and 88 respectively, thus resulting in a defective and unusable battery core. This potential has required the use of thicker separators or of a double thickness patch in the central portion thereof which utilizes volume which could potentially be used for added electrode material.

The concept of the present invention is illustrated in simplified fashion in FIG. 3. In the concept of the present invention, arbor halves 58 and 64 rotate in a clockwise direction to advance separator 90 and thereby again advance positive and negative electrodes 86 and 88, respectively, into engagement between the arbor and kiss roller 54 and 48 respectively. As electrodes 86 and 88 advance, they then engage forming rollers 50 and 56. Forming rollers 50 and 56 are vertically displaced from kiss rollers 48 and 54 to be more closely in line with the horizontal plane passing through the center of the arbor. As a result of the vertical displacement of forming rollers 50 and 56, electrodes 86 and 88 are deflected to conform to the outer curvilinear surface of the arbor. Forming rollers 50 and 56 reduce the stress induced in separator 90 at the point where separator 90 engages the leading edges of electrodes 86 and 88. As a result, there are fewer breaches of the insulative properties of separator 90 and the finished battery core is more tightly wound and more uniformly formed about the arbor. The reduced stresses also permit the use of a smaller diameter arbor thereby increasing the volume within the cell useable for electrodes.

Referring now to FIG. 4, a schematic elevation representation is shown of the general relationship of lower and upper frames 22 and 24, rollers 32 and 34, first and second arbors halves 58 and 64 and first and second forming roller pairs 46 and 52 when frame 24 is pivoted to engage frame 22. It will be noted that each roller 34 is in vertical registration with a lower roller 32 and that the plane of feeder bed 31 is parallel to and disposed to be slightly higher than feeder bed 30.

Turning now to FIGS. 5–8, winding apparatus 20 is shown in simplified form to illustrate its operation. Electrode 86 is placed on second feeder bed 31 such that leading edge 87 is proximate to an edge of flat surface 60 of arbor half 58. Separator 90 is then placed over electrode 86, over arbor half 58, and on first feeder bed 30. Second electrode 88 is then placed on separator 90 on first feeder bed 30 such that leading edge 89 is proximate to an opposite edge of flat surface 60 of arbor half 58 (FIG. 1). Second arbor half 64 is then translated forward over separator 90 and first arbor half 58 such that separator 90 is interposed between first and second flat surfaces 60 and 66 of first and second arbor halves 58 and 64. Upper frame 24 is then rotated down into registration with lower frame 22 and is affixed thereto. Electrode 86 and separator 90, and electrode 88 and separator 90 are now disposed between rollers 32 and 34. Since rollers 34 are spring biased in a downward position, separator 90 and the electrodes 86 and 88 are vertically compressed between rollers 32 and 34 thereby creating a frictional force between separator 90 and electrodes 86 and 88. Pressure cylinders 40 and 44 are then energized to move first and second forming roller pairs 42 and 46 into operating position above and below arbor halves 58 and 64 (FIG. 1). FIG. 5 shows the starting position of separator 90 and of electrodes 86 and 88 with respect to the various components of the winding apparatus 20.

Figure 6:
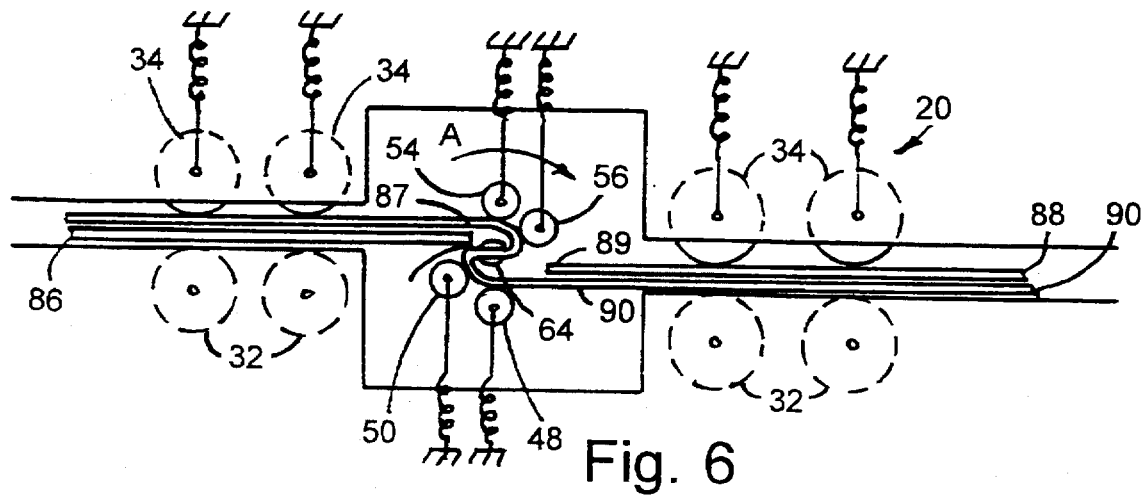
FIG. 6 shows the initiation of the winding process with the arbor having rotated 180° thereby drawing the separator and electrodes into contact with the nest rollers.
Figure 7:
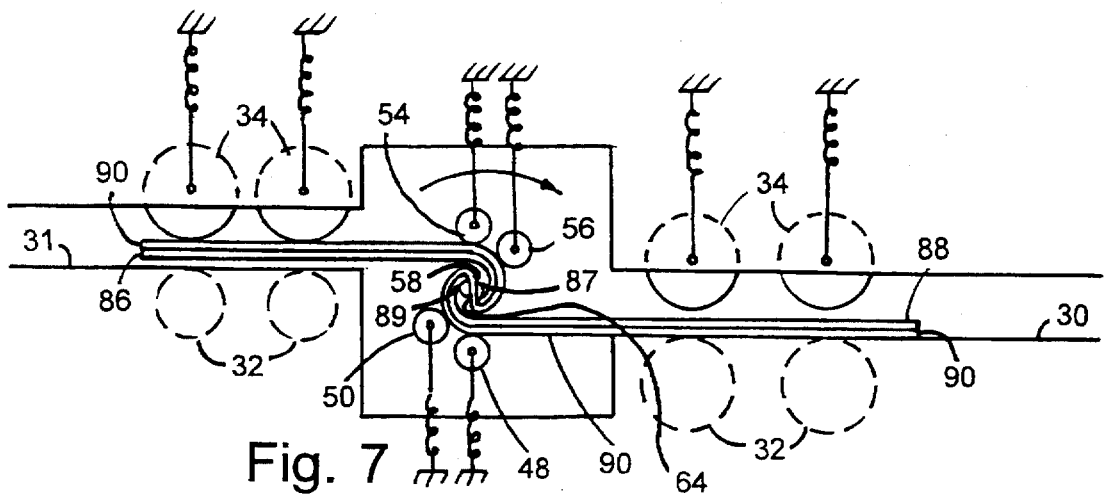
FIG. 7 shows a further rotation of the arbor and the former rollers deflecting the electrode plates into conformance with the curvilinear surface of the arbor.
Figure 8:
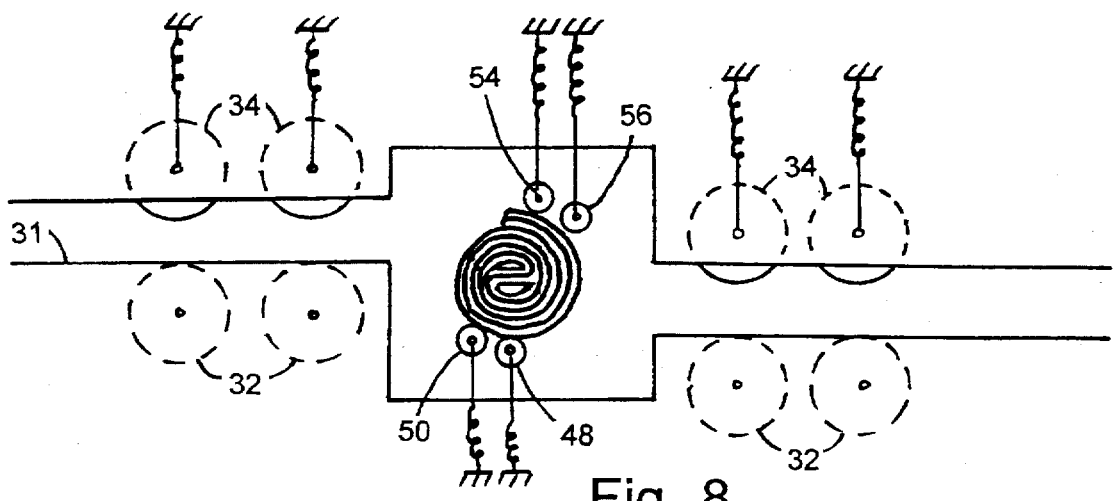
FIG. 8 shows the near completion of the winding process with the kiss rollers maintaining pressure on the rolled battery core.

Turning now to FIG. 6, the beginning of the formation of the spiral battery core is illustrated. In this illustration, arbor halves 58 and 64 have rotated approximately 180° as indicated by A thereby engaging separator 90 between the arbor halves and kiss rollers 48 and 54 and forming rollers 50 and 56. Since rollers 34 are exerting a downward compressive force between separator 90 and electrodes 86 and 88, the resulting frictional force between the separator and the electrodes causes the electrodes to be translated in opposing horizontal directions as separator 90 is drawn into the winding cavity. Leading edges 87 and 89 are brought into respective engagement between kiss rollers 54 and 48. As the arbor continues to rotate in a clockwise direction as indicated by A in FIG. 7, the electrodes 86 and 88 continue their respective horizontal translation into engagement with forming rollers 50 and 56. Leading edges 87 and 89 are deflected by rollers 50 and 56 to conform to curvilinear surfaces 62 and 68 (FIG. 1) of arbor halves 58 and 64. Rollers 48, 50, 54, and 56 maintain contact with the exterior surface of the battery core throughout the winding process and until the battery core is completely wound as illustrated in FIG. 8.

At the completion of the winding process, second arbor half 64 is translated rearward and is disengaged from the battery core. The wound battery core is then slid into a battery casing or can, (not shown). Although the forming roller pairs 46 and 52 (FIG. 1) are still engaged with the exterior of the wound battery core, the wound core is slid relatively easily off arbor half 58 as a result of the low friction coefficient between the outer surface of the core and the metal of forming roller pairs 46 and 52. The pressure in pressure cylinders 40 and 44 is then relieved and forming roller pairs 46 and 52 are disengaged from their bias toward the arbor, and upper frame 24 is pivoted up out of registration with lower frame 22. Winding apparatus 20 is now ready to repeat the process to form another battery core.

In the foregoing description, it will be readily appreciated by those skilled in the art that modifications may be made to the invention without departing from the concepts disclosed herein. Such modifications are to be considered as included in the following claims, unless these claims expressly state otherwise.

The embodiments of the invention in which an exclusive property or privilege is claimed are defined as follows:

1. A battery core winding apparatus for winding into an electrochemical cell, a plurality of flexible strip members comprising a first conducting flexible electrode having a first leading edge, a second conducting flexible electrode having a second leading edge, and a separator, said apparatus comprising:

a first elongate feeder bed;

a second elongate feeder bed longitudinally disposed from said first feeder bed, said first and said second feeder beds defining a winding cavity therebetween;

a first arbor half having a first flat surface and a first curvilinear winding surface, said first arbor half rotatingly supported within said winding cavity substantially midway between said first and said second feeder beds;

a second arbor half having a second flat surface and a second curvilinear winding surface rotatingly supported within said winding cavity substantially midway between said first and said second feeder beds such that said second flat surface faces said first flat surface and said first and said second flat surfaces are interspaced forming a slot therebetween;

a first pair of forming rollers rotatingly supported and disposed within said winding cavity, said first pair of forming rollers substantially equidistant from and biased toward said first arbor half to engage and form the electrochemical cell electrodes and separator about said first and said second curvilinear surfaces during winding of the electrochemical cell;

a second pair of forming rollers disposed within said winding cavity, said second pair of forming rollers substantially equidistant from and biased toward said second arbor half to engage and form the electrochemical cell electrodes and separator about said second and said first curvilinear surfaces during winding of the electrochemical cell;

at least one feeder roller rotatingly embedded in each of said first feeder bed and said second feeder bed, the rotational axis of said feeder rollers being substantially perpendicular to the elongate axis of said first and said second feeder beds; and a pressure roller rotatingly mounted in registration with each of said feeder rollers, the axis of rotation of said pressure roller being parallel to said feeder roller, and said pressure roller being springingly biased against said feeder roller.

2. The battery core winding apparatus of claim 1 wherein: the plane of said first feeder bed is parallel to and offset from the plane of said second feeder bed.

3. The battery core winding apparatus of claim 2 wherein: said second arbor half is translatable from a first non-engaged withdrawn position to a second engaged advanced position.

4. The battery core winding apparatus of claim 1 wherein: said first pair and said second pair of forming rollers are moveable between a first non-engaged position and a second engaged position proximate to said first and said second curvilinear surfaces.

5. The battery core winding apparatus of claim 4 wherein: said first pair and said second pair of forming rollers apply constant pressure to the cell core.

6. The battery core winding apparatus of claim 5 wherein: said first pair of forming rollers comprises a first kiss roller and a first forming roller biased toward said first curvilinear surface, said first kiss roller and said first arbor half forming a plane approximately perpendicular to the plane of the first feeder bed, and said first forming roller positioned between said first kiss roller and said second feeder bed, said first kiss roller and said first forming roller substantially equidistant from said first curvilinear surface forming a first kiss roller gap and a first forming roller gap between said rollers and said first curvilinear surface.

7. The battery core winding apparatus of claim 6 wherein: said second pair of forming rollers comprises a second kiss roller and a second forming roller biased toward said second curvilinear surface, said second kiss roller and said second arbor half forming a plane approximately perpendicular to the plane of said second feeder bed and said second forming roller positioned between said second kiss roller and said first feeder bed, said second kiss roller and said second forming roller substantially equidistant from said second curvilinear surface forming a second kiss roller gap and a second forming roller gap between said rollers and said second curvilinear surface.

8. The battery core winding apparatus of claim 7 wherein: said first kiss roller gap between said first kiss roller and said first curvilinear surface is approximately in the same plane as said first feeder bed; and said second kiss roller gap between said second kiss roller and said second curvilinear surface is approximately in the same plane as said second feeder bed.

9. A method for winding a plurality of flexible strip members into a coil comprising a first conducting flexible electrode having a first leading edge, a second conducting flexible electrode having a second leading edge, and a separator, said method comprising the steps, performed in the sequence listed, of:

positioning the first conducting flexible electrode on a first feeder bed, the first leading edge proximate to a first edge of a first arbor half having a first generally flat surface and a first curvilinear driving surface;

positioning the separator generally on the first conducting flexible electrode, on said first generally flat surface, and on a second feeder bed in line with said first feeder bed;

positioning the second conducting flexible electrode on the separator on said second feeder bed, the second leading edge proximate to a second edge of said first arbor half;

registering a second arbor half having a second generally flat surface and a second curvilinear driving surface to an engagement position over said first arbor half, such that said first and second generally flat surfaces are facing each other thereby interposing the separator between said first and said second flat surfaces;

positioning a first pair of forming rollers proximate to said first curvilinear surface forming a first gap between said first curvilinear surface and said first roller pair and a second pair of forming rollers proximate to said second curvilinear surface forming a second gap between said second curvilinear surface and said second roller pair, said first and second forming roller pairs for forming the electrodes about said first and said second curvilinear surfaces;

rotating said first and second arbor halves to begin winding the separator about said and first and said second arbor halves;

capturing the first leading edge between the separator and the first curvilinear surface and capturing the second leading edge between the separator and the second curvilinear surface by continued rotation of said first and said second arbor halves; and rotating said first and second arbor halves until the coil is completely formed.

10. The method of claim 9 wherein the step of positioning said first and second pairs of forming rollers comprises:

positioning a first pair of forming rollers proximate to said first arbor half such that a first kiss roller of said first pair is in approximately vertical alignment with said first arbor half wherein said first kiss roller and said first curvilinear surface form a first kiss roller gap and a first forming roller of said first pair forms with said first curvilinear surface a first forming roller gap intermediate the central axes of said first arbor half and said first kiss roller;

positioning a second pair of forming rollers proximate to said second arbor half such that a second kiss roller of said second pair is in approximately vertical alignment with said second arbor half wherein said second kiss roller and said second curvilinear surface a second kiss roller gap and a second forming roller of said second pair forms with said second curvilinear surface a second forming roller gap intermediate the central axes of said second arbor half and said second kiss roller.

11. The method of claim 10 wherein the cell also includes a canister, the method further comprising, after the last rotating step, the steps of:

withdrawing said second arbor half from said engagement position;

placing a canister in longitudinal alignment with the coil;

translating the coil from said first arbor half into the canister; and withdrawing said first pair and said second pair of forming rollers from their respective biased positions.

* * * * *